(12) United States Patent
Saund et al.

(10) Patent No.: US 7,086,013 B2
(45) Date of Patent: Aug. 1, 2006

(54) METHOD AND SYSTEM FOR OVERLOADING LOOP SELECTION COMMANDS IN A SYSTEM FOR SELECTING AND ARRANGING VISIBLE MATERIAL IN DOCUMENT IMAGES

(75) Inventors: Eric Saund, San Carlos, CA (US); Daniel G. Bobrow, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 628 days.

(21) Appl. No.: 10/104,804

(22) Filed: Mar. 22, 2002

(65) Prior Publication Data
US 2003/0179235 A1    Sep. 25, 2003

(51) Int. Cl.
*G06F 13/00* (2006.01)
*G06F 15/00* (2006.01)

(52) U.S. Cl. ............... 715/863; 715/860; 345/173

(58) Field of Classification Search ............. 715/853, 715/711, 840, 863, 864, 860, 728, 731, 857, 715/858; 345/173, 174
See application file for complete search history.

(56) References Cited

U.S. PATENT DOCUMENTS

| 5,347,295 | A | * | 9/1994 | Agulnick et al. ........... 345/156 |
| 5,396,590 | A | * | 3/1995 | Kreegar ...................... 715/808 |
| 5,485,565 | A |   | 1/1996 | Saund et al. |
| 5,513,309 | A | * | 4/1996 | Meier et al. ................ 715/860 |
| 5,523,775 | A |   | 6/1996 | Capps |
| 5,760,773 | A |   | 6/1998 | Berman et al. |
| 5,796,406 | A | * | 8/1998 | Shigematsu et al. ........ 715/863 |
| 5,867,150 | A | * | 2/1999 | Bricklin et al. ............. 345/173 |
| 2002/0011993 | A1 |  | 1/2002 | Lui et al. |

* cited by examiner

Primary Examiner—Cao (Kevin) Nguyen

(57) ABSTRACT

A graphical input and display system having a user interface for selecting object(s) to be operated on by the system includes input devices permitting a user to select and establish image object(s) received from various image input sources. A processor, connected to the system, receives requests for various image element selection operations and also accesses a memory structure. The system memory structure includes a user interaction module, which allows a user to select image elements without pre-selecting an element selection mode, as well as data memory.

13 Claims, 8 Drawing Sheets

METHOD AND SYSTEM FOR OVERLOADING LOOP SELECTION COMMANDS IN A SYSTEM FOR SELECTING AND ARRANGING VISIBLE MATERIAL IN DOCUMENT IMAGES

CROSS REFERENCE TO RELATED APPLICATIONS

The following copending applications, U.S. application Ser. No. 10/104,523, filed Mar. 22, 2002, titled "Method and System for Interpreting Imprecise Object Selection Paths", U.S. application Ser. No. 10/104,396, filed Mar. 22, 2002, titled "Method for Gestural Interpretation in a System for Selecting and Arranging Visible Material in Document Images", and U.S. application Ser. No. 10/104,805, filed Mar. 22, 2002, titled "System and Method for Editing Electronic Images", are assigned to the same assignee of the present application. The entire disclosures of these copending applications are totally incorporated herein by reference in their entirety.

INCORPORATION BY REFERENCE

The following U.S. patents are fully incorporated herein by reference: U.S. Pat. No. 5,485,565 to Saund et al. ("Gestural Indicators for Selecting Graphic Objects"); U.S. Pat. No. 5,513,309 to Meier et al. ("Graphic Editor User Interface for a Pointer-Based Computer System"); U.S. Pat. No. 5,523,775 to Capps ("Method for Selecting Objects on a Computer Display"); and U.S. Pat. No. 5,760,773 to Berman et al. ("Methods and Apparatus for Interacting with Data Objects Using Action Handles").

BACKGROUND OF THE INVENTION

This invention relates generally to user interfaces to computational devices, and more particularly to applications in which displayed objects are selected using a mouse or stylus. Two types of interactive drawing/sketching/editing applications are currently in use, both of which support creation of new image material, through draw operations, and selection and manipulation of existing material, through editing operations. The types of interactive applications are distinguished by the emphasis placed on "sketch" and "editing" operations. In an image "editing" program, selection and manipulation of image objects is the primary activity. Therefore, stylus or mouse interaction is designed primarily to interpret stylus input as selection gestures, and the default interpretation of mouse or stylus activity is selection of existing image objects for manipulation. Tools for drawing objects are provided by auxiliary command objects, usually menus.

In a "sketch" program, however, the primary activity is the "draw" operation. To facilitate the sketching process, it is important for users to be able to quickly execute a series of markings such as handwritten or sketched strokes, without having to perform a menu initiation command at every stroke. These programs are designed such that draw operations can be the default interpretation of mouse or stylus activity. The disadvantage to this type of program is that when priority is placed on draw operations, selection operations become demoted and require explicit menu choices or button clicks to invoke a selection, which impedes the smooth flow of multiple selection and manipulation operations.

Using these currently available tools, it can be very difficult to select and move, delete, or otherwise modify salient collections of markings at will. In particular, many user interfaces offer object selection by using the mouse to drag a rectangle enclosing target objects, draw a freeform path enclosing target objects, or define the vertices of a polygon enclosing target objects. There are no extant techniques for making all three of these selection methods available without the user specifying manually which one they intend to use. Additionally, the step of choosing among selection modes disrupts the flow of the task.

U.S. Pat. No. 5,485,565 to Saund et al. titled "Gestural Indicators for Selecting Graphic Objects" discloses a graphical imaging system, in which the rough location, size and shape of objects in the image is summarized by a first characteristic descriptor, representing a parametric "pose" computed for each object. A second characteristic descriptor, for example a "gesture matching" function, is provided in order to select the single object, or the set of objects, that best comports with the user's selection gesture. When most closely matched, these key characteristic descriptors permit simple and natural user gestures to distinguish among a large set of graphic objects that may overlap both spatially. User gestures can be simple slashes passing through the object, or quick, coarse approximations of objects' shapes.

U.S. Pat. No. 5,513,309 to Meier et al. titled "Graphic Editor User Interface for a Pointer-Based Computer System" discloses a graphical editor arranged to permit the user to edit selected graphic objects by highlighting the objects and moving them with editing handles. A bounding box is also drawn about the selected portions of the object. In various aspects of the invention, the user is permitted to edit the object by executing specific actions, including resizing, duplicating, distorting and moving either the entire object or only selected portions. After any of the editing operations is performed, the display is updated to reflect changes made during the editing step.

U.S. Pat. No. 5,523,775 (1996) to Capps titled "Method for Selecting Objects on a Computer Display" teaches a method for selecting objects on a screen of a pen-based computer system. The user's intention to enter the selection mode is indicated by the user's performing a special action with the stylus, such as holding the stylus in one place for a minimum amount of time, tapping the stylus immediately prior to and in the same location the highlighted gesture is to begin, or drawing a small circle. Each of these approaches is prone to user error. For example, a user may place the stylus down while thinking about the shape of the stroke to be drawn and unexpectedly be placed in a "highlight" (selection) mode. Similar problems occur with the "tap-and-a-half" and "small circle" methods described in Capps. Like other existing methods in this field, under the Capps invention the user is required to declare in advance of their stroke that the stroke is to be interpreted in terms of "highlight" (select) mode.

U.S. Pat. No. 5,760,773 to Berman et al. titled "Methods and Apparatus for Interacting with Data Objects Using Action Handles" teaches a central processing unit coupled to a pointer control device such as a pen, stylus or mouse, that permits the user to selectively position a pointer and activate an action handle on a display associated with a data object. Activation of the action handle signals the central processing unit of selections associated with the data object. Tapping or clicking on the action handle causes display of a context menu containing at least one command that may be invoked with respect to the data object. Dragging the action handle indicates movement or dragging of the action handle and the corresponding data object for an operation associated with dragging such as drag-and-drop.

The present invention offers a user interface technique permitting users to perform any of four types of selection method (click/tap, rectangle drag, path draw, and polygon draw) using a mouse or stylus without having to specify among these selection methods explicitly using a menu or other intermediate step.

SUMMARY OF THE INVENTION

Briefly stated, and in accordance with one aspect of the present invention, there is disclosed herein a graphical input and display system having a user interface for selecting image object to be operated on by the system. The system includes input devices permitting a user to select and establish image object(s) received from various image input sources. A processor, connected to the system, receives requests for various image element selection operations and also accesses a memory structure. The system memory structure includes a user interaction module, which allows a user to select image elements without pre-selecting an element selection mode, as well as data memory.

In another aspect of the invention, there is disclosed a method for utilizing a user interface on a graphical input and display system to select image elements to be operated on by the system without pre-selecting an element selection mode. After user input is received, the system determines the selection mode of the input selection and performs the selection operation.

In yet another aspect of the invention, there is provided an article of manufacture in the form of a computer usable medium having computer readable program code embodied in the medium. When the program code is executed by the computer, the computer usable medium causes the computer to perform method steps for selecting image elements to be operated on by the system, without pre-selecting an element selection mode. The program readable code causes the computer to receive a user input selection, determine the selection mode of the input, and perform the selection operation.

In another aspect of the invention, there is provided a memory for storing data for access by a program being executed on a computer for invoking object selection operations for selecting objects to be operated on by the system without pre-selecting an element selection mode. The memory includes a displayed objects data structure stored in the memory, a selected region data structure, a selection gesture data structure, and selected objects data structure.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Disclosed herein is a method and apparatus for object selection in mouse and stylus editing of electronic images. In the following description numerous specific details are set forth in order to provide a thorough understanding of the present invention. It would be apparent, however, to one skilled in the art to practice the invention without such specific details. In other instances, specific implementation details such as parsing techniques for extracting characters from a document image, have not been shown in detail in order not to unnecessarily obscure the present invention.

As will become apparent in the description below, the present invention finds particular advantage in editing text and line art contained in an image. Documents which are faxed or which are copied on a digital copier typically involve images that contain primarily text and graphics. As described with respect to the prior art, it is common that in order to edit any of the text contained in the image, extraneous processing such as Optical Character Recognition (OCR) or the placement of image information into layers must be performed. As will become apparent, the present invention minimizes extraneous processing and provides added flexibility to defining both text and graphical image information so as to allow the editing of a wider range of textual and graphical data in an image.

Figure 1:
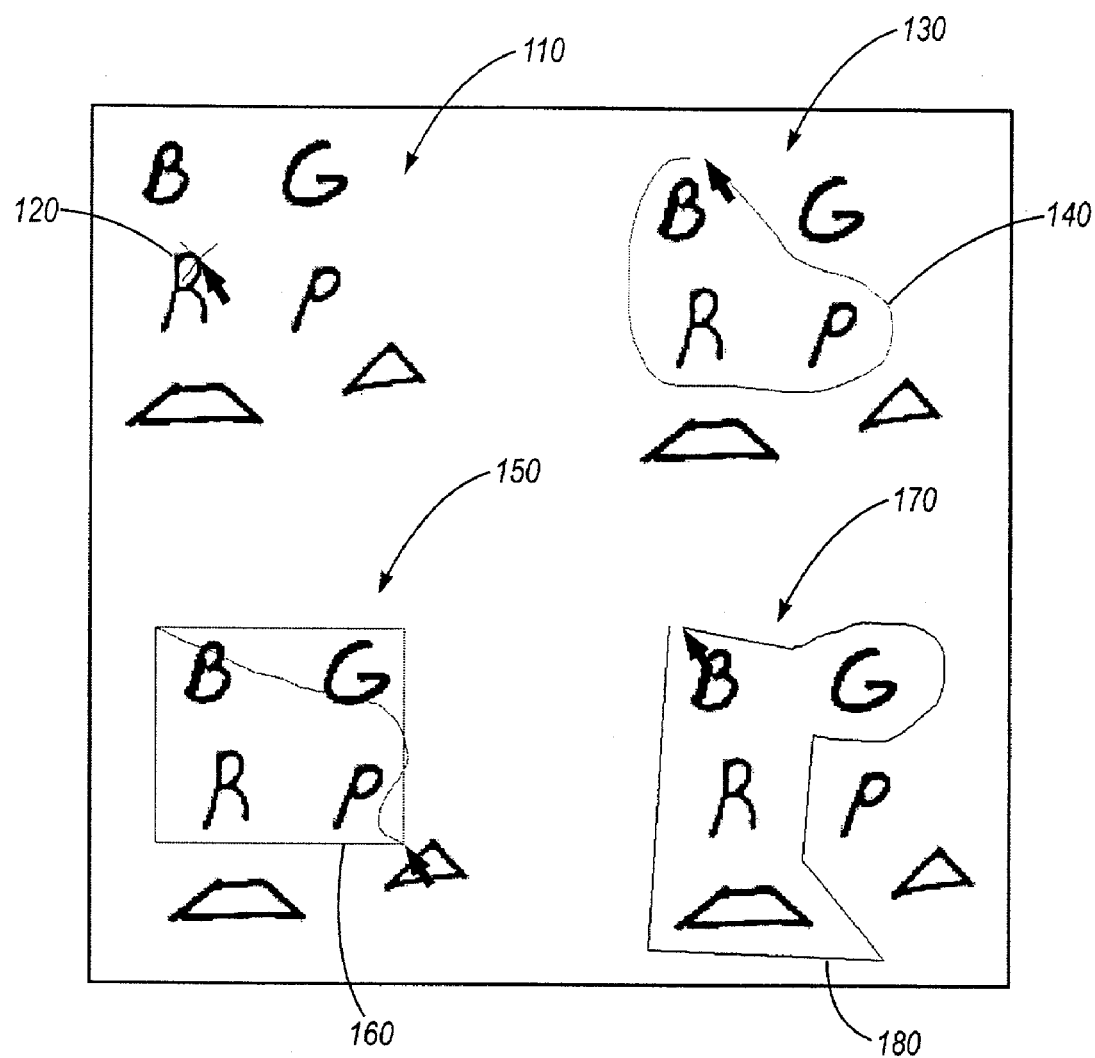
FIG. 1 object selection using a mouse or stylus.

A number of standard event handling techniques are utilized by existing user interfaces, such as a mouse click, mouse release, or mouse drag. In a mouse drag event, the mouse button is depressed as the mouse is moved. A stylus may be used instead of a mouse, replacing mouse press and mouse release events with stylus touch and stylus lift events. These event handling techniques are illustrated in FIG. 1, in which discrete objects 110 are shown as they may be displayed on a display screen. A single mouse click or stylus tap at point 120 on discrete object "R" selects "R". For displayed objects 130, objects "B", "R" and "P" are selected through being enclosed by freeform path 140. In displayed objects 150, "B", "G", "R" and "P" are selected through use of a rectangle drag as they are enclosed by rectangle 160. In the case of discrete displayed objects 170, a polygon enclosure selects objects "B", "G", "R" and the trapezoid. Existing user interfaces permit any or all of these selection methods, but require the user to specify which mode is to be used before performing and object selection operation. Typically, this may be done by clicking on an icon in a toolbar.

Figure 2:
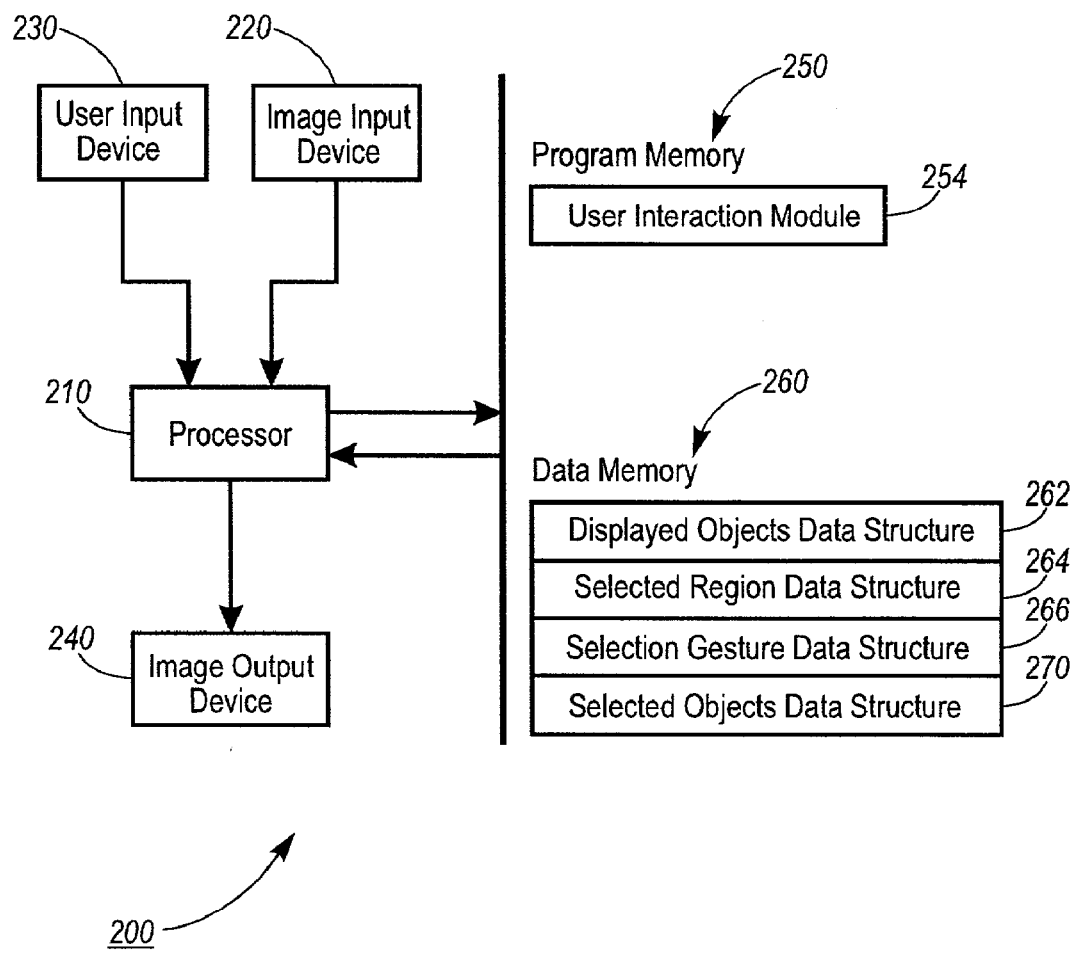
FIG. 2 is a block diagram showing general components of a system that can edit images according to the invention.

Referring now to FIG. 2, system 200 includes processor 210, connected to receive signals from image input device 220 and user input device 230. Image input device 220 could be a scanner, a facsimile receiver or other image receiver, a camera, or other appropriate device or could be a part of local or remote memory that stores an image in digital form. User input device 230 could, for example, be a keyboard with a mouse. Processor 210 can also be connected to image output device 240, such as a screen display, a printer, a facsimile transmitter or other image transmitter, or a part of local or remote memory that can store an image in digital form. Processor 210 is also connected to access program memory 250 and data memory 260. Program memory 250 includes user interaction module 254. Data memory 260 includes displayed objects data structure 262, selected region data structure, selection gesture data structure 266, tolerance tunnel data structure 268, and selected objects data structure 270.

Figure 3:
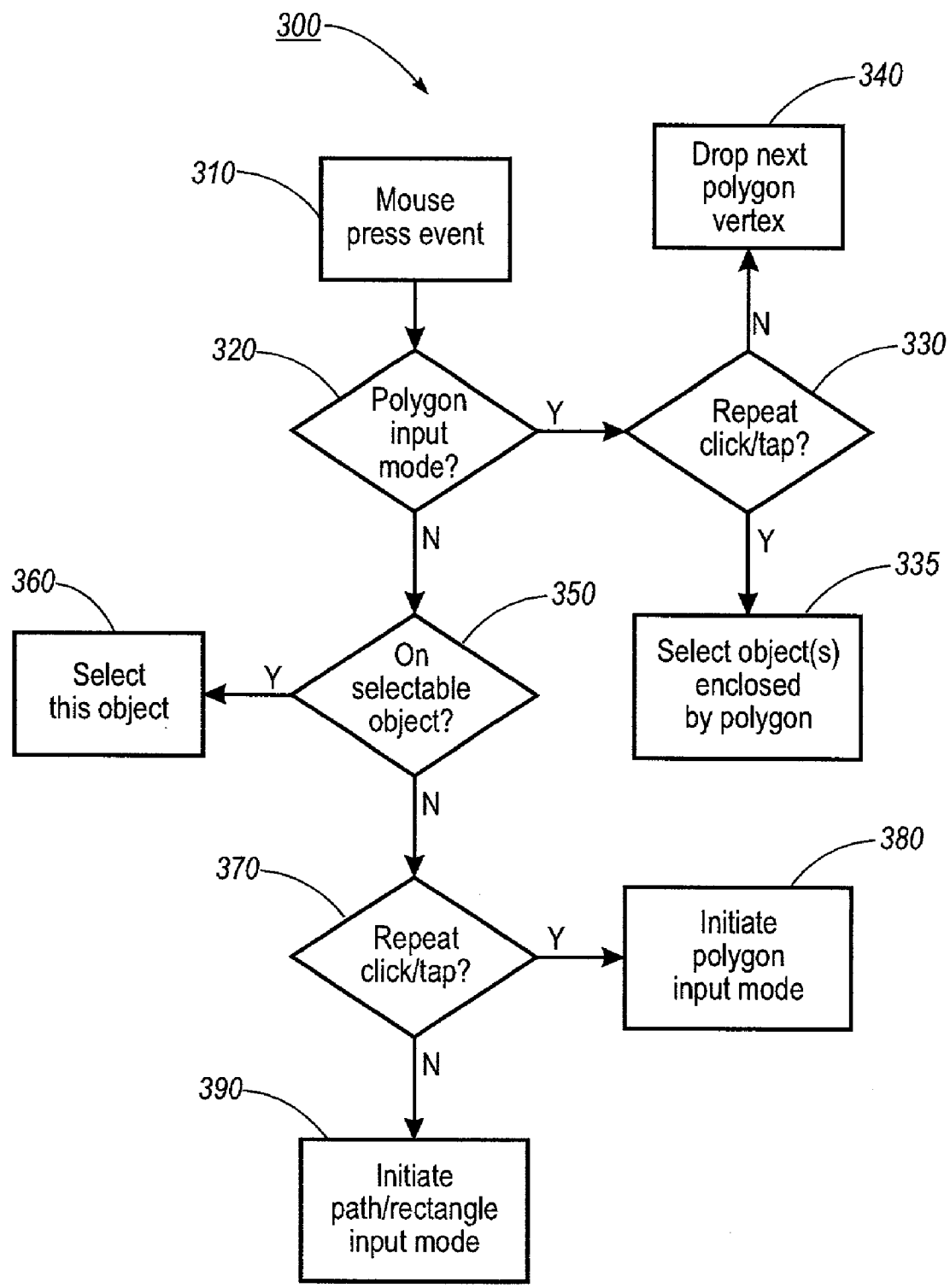
FIG. 3 is a flow chart showing steps in the click/tap and polygon draw selection method.

FIG. 3 illustrates example steps in the click/tap and polygon draw method for object selection. At step 310 the user performs a mouse press event, which could be a tap or mouse click. A determination is made at step 320 as to whether polygon input mode is to be engaged. If the polygon input mode is to be engaged, at step 330 the user may repeat the click or tap action. When the click or tap action is repeated, the processor selects the objects enclosed by a polygon at step 335. In the event the click or tap action is not repeated, the processor drops the next polygon vertex at step 340. Returning to step 320, if the user elects not to use the polygon input mode, the processor determines whether the object indicator is located on a selectable object at step 350. If the object indicator is located on a selectable object, the user may then select this object at step 360. If the object indicator is not located on a selectable object, then the user decides whether to repeat the click or tap at step 370. If the click or tap is repeated, the processor initiates the polygon input mode at step 380. When the click or tap is not repeated at step 370, then the processor initiates the path/rectangle input mode at step 390.

Figure 4:
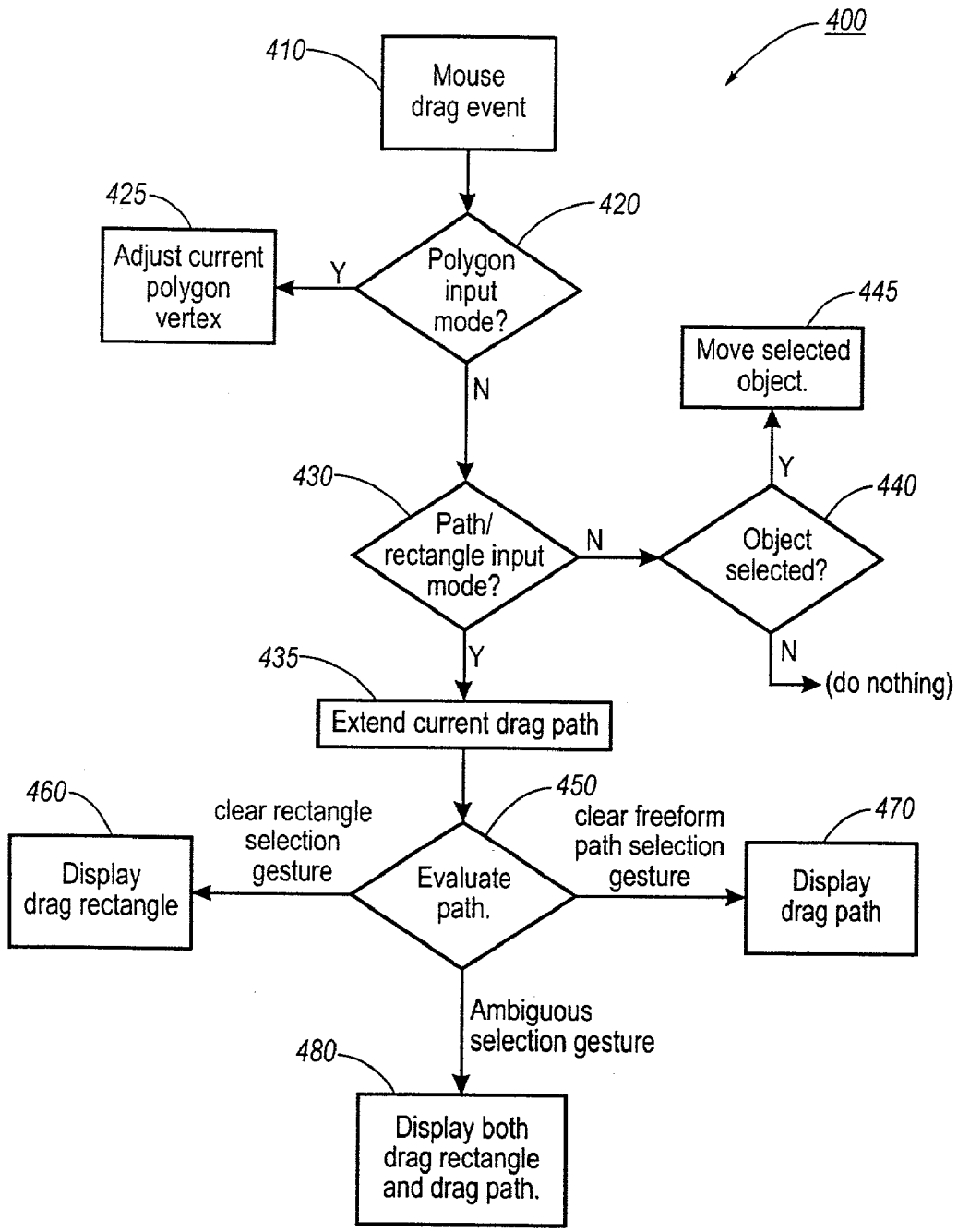
FIG. 4 is a flow chart showing steps in the rectangle drag selection method.

Referring now to FIG. 4, there is shown a flow chart illustrating the steps in the rectangle drag and freeform path methods of object selection. At step 410 a mouse drag event is initiated. The user determines whether to utilize the polygon input mode at step 420. If the polygon input mode is selected, the processor adjusts the current polygon vertex at step 425. If the polygon input mode is not selected, a decision is made at step 430 as to whether to select the path/rectangle input mode. When the path/rectangle input mode is not selected, the processor, at step 440, determines whether an object has been selected. If an object has been selected, it is moved at step 445. If an object has not been selected, the processor takes no action. Returning now to step 430, if the path/rectangle input mode is selected, then an evaluation of the path is initiated at step 450. If a clear rectangle selection gesture is provided, the processor displays the drag rectangle at step 460. If the selection gesture is a clear freeform path, then the drag path is displayed at step 470. In those cases in which the selection gesture is ambiguous, both the drag rectangle and drag path are displayed at step 480.

Figure 5:
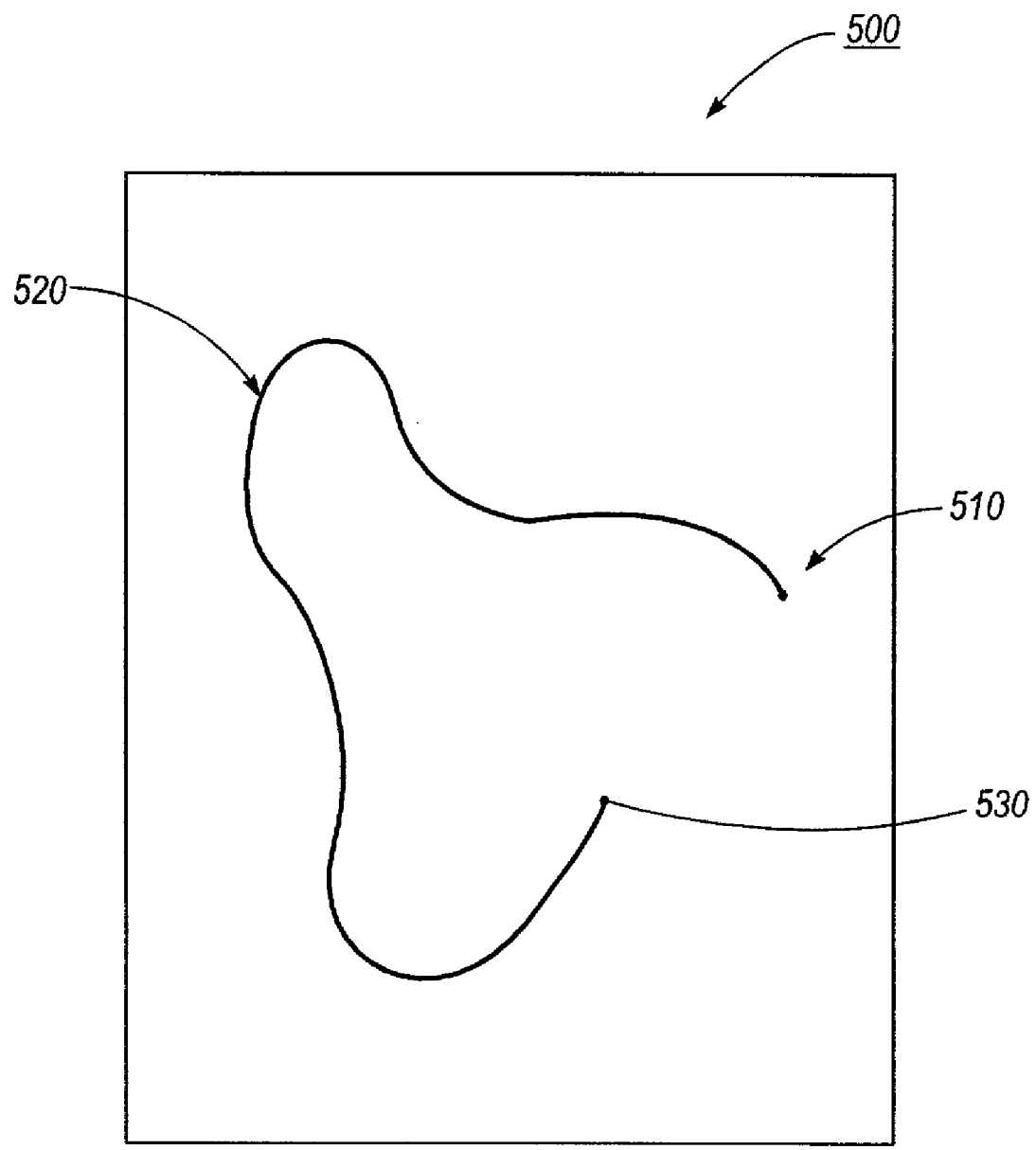
FIG. 5 illustrates a free-form path selection gesture.

Freeform path selection gestures and enclosing rectangle selection gestures are both initiated by the same event, a single mouse click not occurring over a selectable object. In this state, the spatial characteristics of the gesture are analyzed to determine whether it has the characteristics of a freeform path, a rectangle, or either/both. Depending on this analysis, either the path, the rectangle, or both are displayed. This decision may be made, for example, as shown in FIG. 5, which illustrates a display screen 500. In the case in which point 510 is the starting point of the selection gesture, point 520 is the point on the gesture thus far farthest from starting point 510, and 530 is the current location point of the gesture (the current position of the mouse or stylus). If the distance between initial point 510 and point 530 is less than the distance between point 520 (the maximum point) and point 530, then the selection gesture is judged to be a freeform path selection. If the distance between initial point 510 and point 530 is greater than the distance between point 520 (the maximum point) and point 530, then the selection gesture is judged to be ambiguous.

Figure 6:
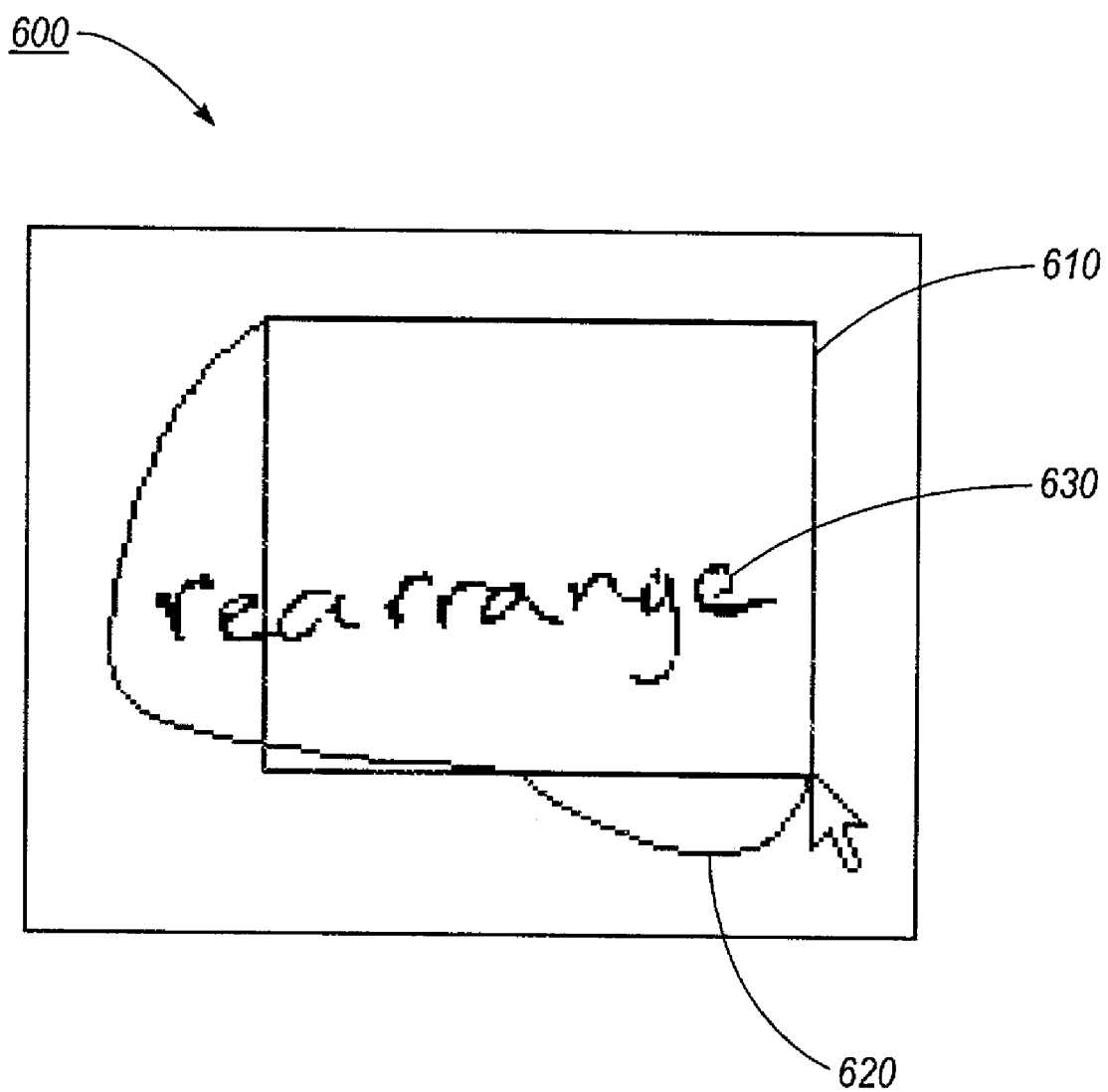
FIG. 6 illustrates a display during an ambiguous selection gesture.

FIG. 6 illustrates the display during an ambiguous selection gesture. In this example, display screen 600 shows both a drag rectangle gesture 610 and a freeform selection gesture 620 selecting object 630. Both drag rectangle gesture 610 and freeform selection gesture 620 remain visible on the display as the selection gesture is being drawn. Many users are able to disregard the displayed freeform path or drag rectangle when their intent is to select using the other type of gesture. When the mouse is released from freeform path/rectangle selection mode, the same criterion is used to determine whether the final gesture is regarded as a freeform path, or, if not, then as an enclosing rectangle, as described in FIG. 7. If the user wishes to select only the object(s) enclosed by rectangle 610, the user releases the mouse button. If the user desires to include additional object(s), then the user continues drawing a freeform path. Until a selection is made, both freeform selection path 620 and rectangular selection path 610 remain visible on the display.

Figure 7:
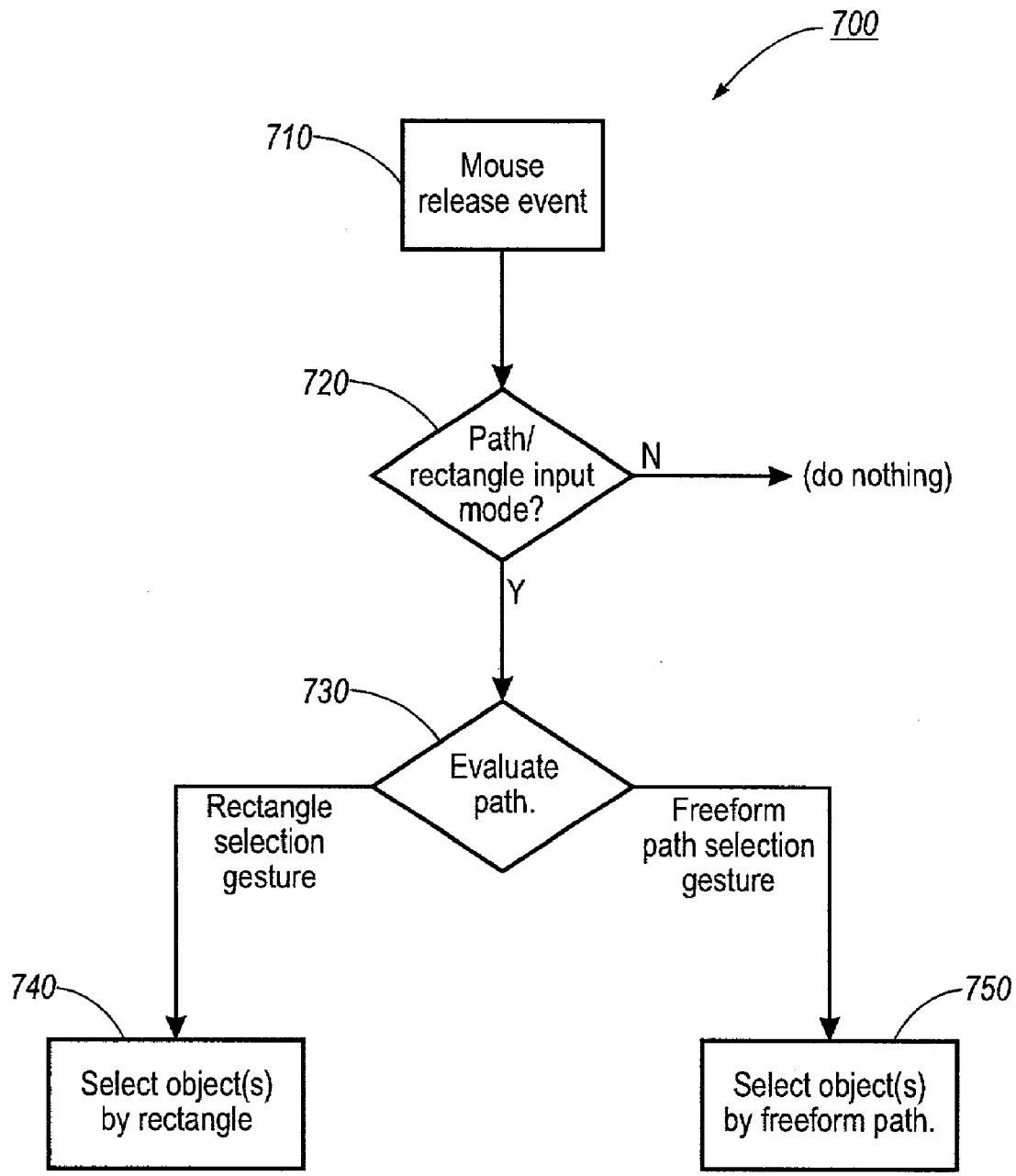
FIG. 7 is a flow chart showing steps in the path draw selection method.

In FIG. 7, when mouse release event 710 occurs, the user determines whether to evaluate if the gesture is a freeform path or an enclosing rectangle at step 720. If a decision is made to evaluate the input mode, at step 730 the processor evaluates the path. In the case in which an enclosing rectangle is identified as the gesture, then at step 740 objects are selected by rectangle. If a freeform path is identified as the gesture, then at step 750 objects are selected by freeform path.

Figure 8:
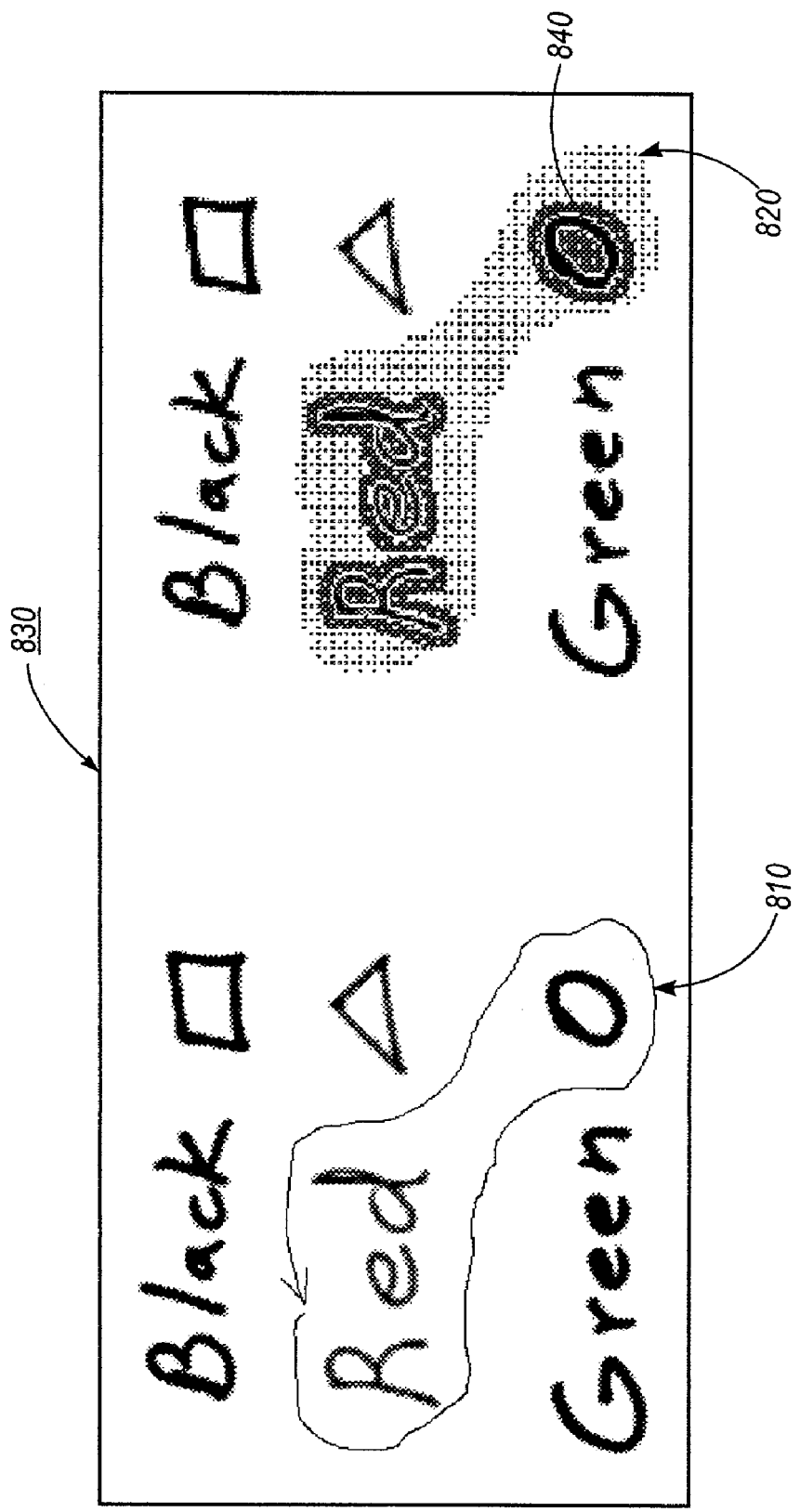
FIG. 8 illustrates selected region highlighting according to the present invention.

In an alternate embodiment of the present invention, once a user has caused objects to be selected by dragging a freeform path, dragging a rectangle or other parametric shape, or by placing the vertices of a polygon, not only are these objects displayed in highlight form, but also the entire region enclosed by the selection gesture is indicated by a distinct highlight indicator. For example, in one embodiment illustrated in FIG. 8, discrete objects 830 are displayed. The objects "Red" and "O" are selected by freeform path 810. These selected foreground image objects themselves are highlighted by causing background pixels 840 occurring within a fixed small distance of these objects' foreground pixels to appear as a preselected color, for example, a semitransparent green. Then, the enclosure region 820 of the selection gesture may be highlighted in a lighter shade of green, or any other preselected color. This highlight function occurs at step 740 in FIG. 7 ("Select object(s) by rectangle"), step 750 in FIG. 7 ("Select object(s) by freeform path"), and at step 335 in FIG. 3 ("Select object(s) enclosed by polygon").

This embodiment advantageously presents the user with a clear indication of the system's interpretation of the selection gesture. Additionally, the user is assisted in visually locating all foreground mage objects that were selected by the selection gesture. Finally, the highlighted enclosure region itself becomes "active", such that a mouse or stylus action anywhere in the enclosure region may cause move, pop-up menu, or other command operations. In the context of an advanced image editing system such as described in copending U.S. patent application Ser. No. 10/104,805 ("System and Method for Editing Electronic Images"), user interaction is facilitated by removing the requirement for positioning the mouse or stylus directly over a selected foreground object in order to move or otherwise modify the collection of selected objects.

While the present invention has been illustrated and described with reference to specific embodiments, further modification and improvements will occur to those skilled in the art. Although discussed with reference to text and line art, the operations illustrated herein apply equally well to any type of image object. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed is:

1. A graphical input and display system having a user interface for selecting image objects to be operated on by the system, comprising:
   image object input means for entering said electronic image objects onto a display means;
   user input means for receiving user selection commands;
   a processor, connected for receiving requests for image object selection operations and for accessing a memory structure;
   a user interaction module for selecting image objects without pre-selecting an object selection mode, wherein said object selection mode comprises a plurality of selection modes including rectangle drag mode, freeform pat mode, a polygon enclosure mode, and clicking or tapping on an element; and
   data memory means.

2. The graphical input and display system according to claim 1, wherein said user input means comprises an electronic mouse.

3. The graphical input and display system according to claim 1, wherein said user input means comprises a stylus.

4. A method for utilizing a user interface on a graphical input and display system having user input means, image input moans, a processor, and a user interaction module for selecting image objects without pre-selecting an object selection mode for selecting objects to be operated on by the system, comprising:
   receiving a user input selection;
   automatically determining the selection mode, wherein said selection mode comprises a plurality of selection modes including rectangle drag mode, freeform path mode, a polygon enclosure mode, and clicking or tapping on an element of said input selection; and
   performing the selection operation.

5. The method for utilizing a user interface on a graphical input and display system for selecting image objects to be operated on by the system according to claim 4, wherein said user input selection comprises a mouse click or stylus tap event.

6. The method for utilizing a user interface on a graphical input and display system for selecting image objects to be operated on by the system according to claim 5, wherein determining the selection mode of said input selection comprises:
   selecting the object if said click or tap event is preformed on an image object;
   initiating the path/rectangle mode if said click or tap event is not performed on said image object; and
   initiating the polygon input mode if a second click or tap event is performed.

7. The method for utilizing a user interface on a graphical input and display system for selecting image objects to be operated on by the system according to claim 4, wherein said user input selection comprises a mouse or stylus drag event.

8. The method for utilizing a user interface on a graphical input and display system for selecting image elements to be operated on by the system according to claim 7, wherein determining the selection mode of said input selection comprises:
   evaluating the path of said mouse or stylus drag event;
   displaying a drag rectangle if said pat is a clear rectangle selection gesture;
   displaying a drag path if said pat is a clear freeform path; and
   displaying both a drag path and a drag rectangle if said path is an ambiguous selection gesture.

9. The method for utilizing a user interface on a graphical input and display system for selecting image elements to be operated on by the system according to claim 4, wherein said user input selection comprises a mouse release or stylus lift event.

10. The method for utilizing a user interface on a graphical input and display system for selecting image elements to be operated on by the system according to claim 9, wherein determining the selection mode of said input selection comprises:
    evaluating the path drawn prior to said mouse release or stylus lift event;
    selecting the objects by a rectangle if said path is evaluated to be a clear rectangle selection gesture; and
    selecting the objects enclosed by a freeform path if said path is evaluated to be a freeform path selection gesture.

11. The method for utilizing a user interface on a graphical input and display system for selecting image elements to be operated on by the system according to claim 10, further comprising highlighting the region enclosed by said rectangle or said freeform path.

12. An article of manufacture comprising a computer usable medium having computer readable program code embodied in said medium which, when said program code is executed by said computer causes said computer to perform method steps for selecting image elements without pre-selecting an clement selection mode for selecting objects to be operated on by the system, said method steps comprising;
    receiving a user input selection;
    automatically determining the selection mode of said input selection, wherein said selection mode comprises a plurality of selection modes including rectangle drag mode, freeform pat mode, a polygon enclosure mode, and clicking or tapping on an element; and
    performing the selection operation.

13. A memory for storing data for access by a program being executed on a computer for invoking object selection operations without pre-selecting an element selection mode for selecting objects to be operated on by the system, said memory comprising:
    displayed objects data structure stored in said memory;
    selected region data structure;
    selection gesture data structure, wherein said selection gesture data structure comprises a plurality of selection modes including rectangle drag mode, freeform path mode, a polygon enclosure mode, and clicking or tapping on an element; and
    selected objects data structure.

* * * * *